(12) United States Patent
Commaret et al.

(10) Patent No.: US 10,684,018 B2
(45) Date of Patent: Jun. 16, 2020

(54) COMBUSTION CHAMBER OF A TURBINE ENGINE

(71) Applicant: SAFRAN AIRCRAFT ENGINES, Paris (FR)

(72) Inventors: Patrice André Commaret, Vaux le Penil (FR); Romain Nicolas Lunel, Montereau sur le Jard (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 166 days.

(21) Appl. No.: 15/916,061

(22) Filed: Mar. 8, 2018

(65) Prior Publication Data

US 2018/0266690 A1    Sep. 20, 2018

(30) Foreign Application Priority Data

Mar. 14, 2017  (FR) ...................................... 17 52070

(51) Int. Cl.
*F23R 3/06* (2006.01)
*F23R 3/50* (2006.01)
(Continued)

(52) U.S. Cl.
CPC ................ *F23R 3/06* (2013.01); *F23R 3/005* (2013.01); *F23R 3/10* (2013.01); *F23R 3/50* (2013.01);
(Continued)

(58) Field of Classification Search
CPC ....... F05D 2240/15; F23M 9/02; F23R 3/002; F23R 3/005; F23R 3/06; F23R 3/10;
(Continued)

(56) References Cited

U.S. PATENT DOCUMENTS 3,631,675 A * 1/1972 Keiter ...................... F23R 3/26
                                                    60/737
3,877,221 A * 4/1975 Lefebvre .................. F23R 3/04
                                                    60/751
(Continued)

FOREIGN PATENT DOCUMENTS

EP          0724119 A2    7/1996
EP          1271059 A2    1/2003
(Continued)

OTHER PUBLICATIONS

Rapport de Recherche Préliminaire / Opinion Écrite sur la Brevetabilité de l'Invention, mailed Jun. 6, 2017, issued in corresponding French Application No. 1752070, filed Oct. 17, 2017, 6 pages.

*Primary Examiner* — Scott J Walthour
(74) *Attorney, Agent, or Firm* — Christensen O'Connor Johnson Kindness, PLLC; Ryan E. Dodge, Jr.

(57) ABSTRACT

An annular combustion chamber with an axis of revolution of a turbine engine delimited by coaxial inner and outer annular walls joined upstream by a substantially transverse bottom of the chamber, the chamber further comprising at least one annular deflector placed in the chamber and substantially parallel to the bottom of the chamber the bottom of the chamber having orifices designed to be passed through by the impact cooling air of the deflector and coming from upstream. The deflector is attached to the inner and outer walls in a sealed manner, and the cooling air of the deflector is discharged from the chamber through exhaust holes formed in the inner and outer walls.

8 Claims, 2 Drawing Sheets

(51) Int. Cl.
*F23R 3/00* (2006.01)
*F23R 3/10* (2006.01)

(52) U.S. Cl.
CPC ............... *F23R 2900/00012* (2013.01); *F23R 2900/03044* (2013.01); *Y02T 50/675* (2013.01)

(58) Field of Classification Search
CPC .... F23R 3/42; F23R 3/425; F23R 3/44; F23R 3/46; F23R 3/50; F23R 3/52; F23R 3/54; F23R 3/58; F23R 3/60; F23R 2900/00012; F23R 2900/03044
See application file for complete search history.

(56) References Cited

U.S. PATENT DOCUMENTS

| | | | | |
|---|---|---|---|---|
| 4,458,479 A | * | 7/1984 | Reider | F23R 3/02 60/751 |
| 4,864,827 A | * | 9/1989 | Richardson | F23R 3/002 60/756 |
| 5,012,645 A | * | 5/1991 | Reynolds | F23R 3/002 60/754 |
| 5,396,759 A | * | 3/1995 | Richardson | F23R 3/002 60/756 |
| 5,765,376 A | * | 6/1998 | Zarzalis | F23R 3/10 60/748 |
| 5,916,142 A | * | 6/1999 | Snyder | F23C 7/004 60/740 |
| 5,941,076 A | * | 8/1999 | Sandelis | F23R 3/002 60/752 |
| 9,297,533 B2 | | 3/2016 | Melton et al. | |
| 2003/0000217 A1 | * | 1/2003 | North | F23R 3/002 60/772 |
| 2009/0019856 A1 | | 1/2009 | Commaret et al. | |
| 2013/0312420 A1 | | 11/2013 | Commaret et al. | |
| 2014/0116060 A1 | * | 5/2014 | Melton | F23R 3/283 60/755 |
| 2016/0054003 A1 | | 2/2016 | Carnell, Jr. et al. | |

FOREIGN PATENT DOCUMENTS

| | | |
|---|---|---|
| EP | 2012061 A1 | 1/2009 |
| EP | 2728263 A1 | 5/2014 |
| WO | 2014/052965 A1 | 4/2014 |

* cited by examiner

COMBUSTION CHAMBER OF A TURBINE ENGINE

TECHNICAL FIELD

Embodiments of the present disclosure relate to a combustion chamber of a gas generator of a turbine engine.

BACKGROUND

A turbine engine comprises a gas generator which comprises, in particular, one or more compressors, for example low-pressure and high-pressure compressors, arranged upstream of a combustion chamber.

By convention, in the present application, the terms "upstream" and "downstream" are defined with respect to the gas flow direction in the turbine engine. Similarly, by convention in the present application, the terms "inner" and "outer" are defined radially with respect to the longitudinal axis of the turbine engine, which is in particular the axis of rotation of the rotors of the compressors.

Traditionally, the combustion chamber is annular with an axis C of revolution and is placed in an annular enclosure which is radially delimited by an outer annular casing and an inner annular casing. The combustion chamber is delimited by coaxial inner and outer annular walls which are joined upstream by a substantially transverse, also annular, bottom of the chamber.

The combustion chamber is in particular supplied with compressed air coming, for example, from a high-pressure compressor arranged upstream of the combustion chamber, in particular via an annular diffuser, and with fuel via injection devices which are angularly distributed around the axis C. The combustion of the air/fuel mixture is initiated by an ignition device and in particular generates thermal radiation from downstream to upstream towards the bottom of the chamber, the bottom of the chamber thus being subjected to high temperatures. In order to protect the bottom of the chamber, at least one annular deflector (also called a heat shield) is placed in the combustion chamber facing the bottom in a substantially parallel manner, and at a short distance from this. The deflector is generally divided into sectors and formed of a plurality of deflector sectors which are angularly distributed around the axis C.

The deflector sectors are cooled by the impact of air jets which also come from the high-pressure compressor and enter the combustion chamber through cooling orifices formed in the bottom of the chamber.

In this way, the cooling air of the deflector sectors, flowing from upstream to downstream, passes through the bottom of the chamber through the cooling orifices and then impacts the deflector sectors. The air is then guided radially towards the interior and exterior of the chamber in order to introduce, on each of the inner and outer walls, a film of cooling air which flows from upstream to downstream.

Even though this architecture makes it possible to slightly cool the inner and outer walls on an upstream portion of the chamber, it nevertheless poses some difficulties, in particular when the turbine engine is operating at an idle speed.

In fact, in particular at an idle speed, these films of cooling air trap fuel and, in other words, a quantity of fuel (generally hydrocarbons) is unburnt, which is disadvantageous for combustion efficiency.

The prior art included published patent applications EP-A1-2012061, EP-A1-2728263, US-A1-2016/054003, EP-A2-1271059, EP-A2-0724119, and WO-A1-2014/052965, each of which is hereby incorporated by reference.

SUMMARY

The object of the present disclosure is to overcome the aforementioned disadvantage. To this end, embodiments of the present disclosure propose an annular combustion chamber, with an axis C of revolution, of a turbine engine delimited by coaxial inner and outer annular walls joined upstream by a substantially transverse bottom of the chamber, the chamber further comprising at least one annular deflector placed in the chamber and substantially parallel to the bottom of the chamber, the bottom of the chamber comprising orifices designed to be passed through by the impact cooling air of the deflector and coming from upstream, wherein the deflector is attached to the inner and outer walls in a sealed manner, and the cooling air of the deflector is discharged from the chamber through exhaust holes formed in the inner and outer walls.

Such an assembly makes it possible to effectively cool the deflector without introducing a cooling film on each of the inner and outer walls, which is advantageous to combustion efficiency and more generally to the turbine engine.

The chamber according to the disclosure may comprise one or more of the following characteristics, taken in isolation from one another or in combination with one another:

the deflector comprises an annular partition for separating the cooling air, the partition projecting towards the bottom of the chamber;

the deflector is divided into sectors and comprises a plurality of deflector sectors which are angularly distributed around the axis C, the sectors being joined in a sealed manner with respect to one another;

each deflector sector is attached to the inner and outer walls in a sealed manner via an inner blade and an outer blade respectively, the inner blade being engaged in a groove made in the outer surface of the inner wall and an inner housing of the deflector sector, and the outer blade being engaged in a groove made in the inner surface of the outer wall and an outer housing of the deflector sector;

a first deflector sector is joined to a second adjacent deflector sector in a sealed manner via a radial tongue, the tongue being engaged in radial recesses of the first and second deflector sectors;

the inner and outer blades are integrally formed with the tongue in such a way as to form a one-piece assembly;

each of the exhaust holes is inclined at an angle A with respect to a normal N to the inner or outer wall concerned.

The second object of the disclosure is a turbine engine comprising a combustion chamber as previously described

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
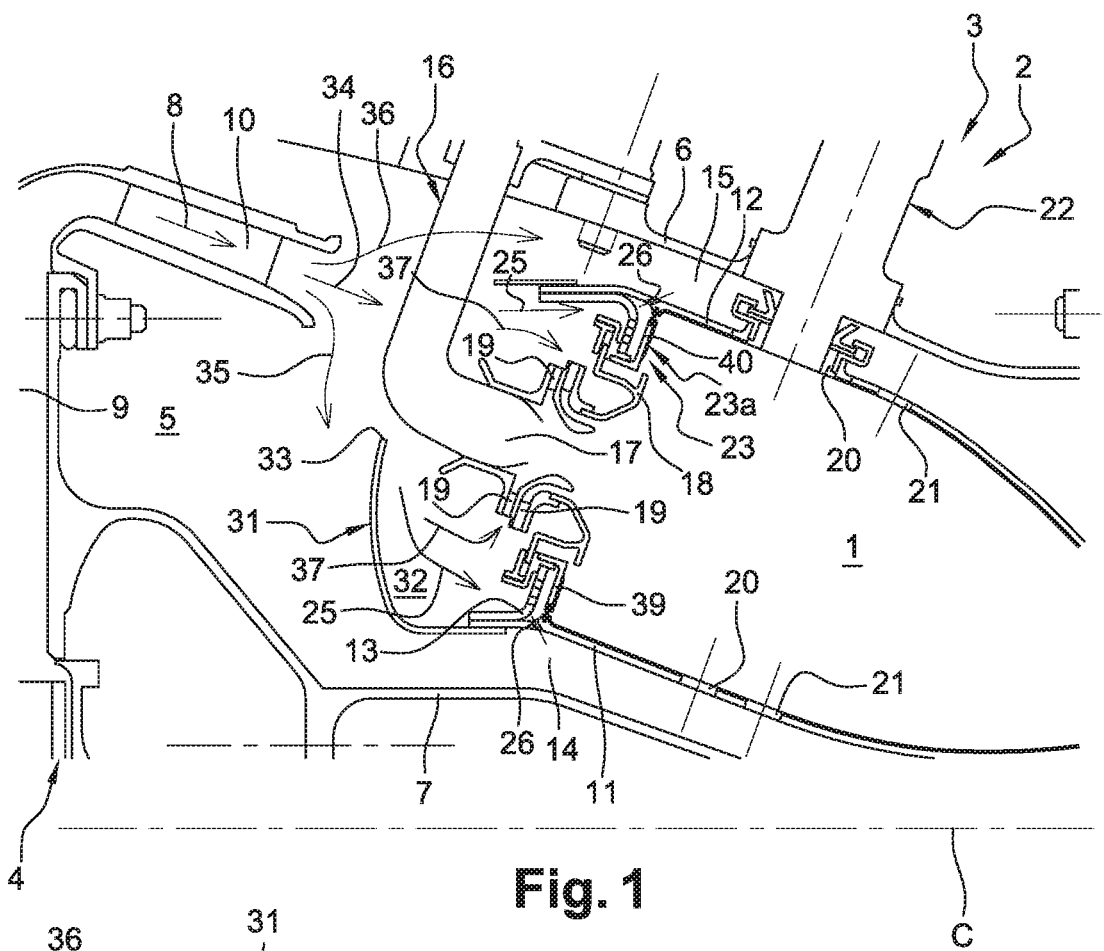
FIG. 1 is a detailed view of a longitudinal half-section of a turbine engine illustrating in particular a combustion chamber of the turbine engine.

FIG. 1 shows an annular combustion chamber 1, with an axis C of revolution, of a gas generator 2 of an aircraft turbine engine 3.

The combustion chamber 1 is placed downstream of one or more compressors, for example low-pressure and high-pressure compressors, and upstream of one or more turbines, for example low-pressure and high-pressure turbines.

The axis C of revolution of the combustion chamber 1 coincides with the longitudinal axis of the turbine engine 3, which is in particular the axis of rotation of the rotors of the compressors and turbines.

According to the embodiment illustrated in the FIGURES and in particular FIG. 1, the combustion chamber 1 is in particular placed downstream of a high-pressure centrifugal compressor 4.

More specifically, the chamber 1 is placed in an annular enclosure 5 which is radially delimited by an outer annular casing 6 and an inner annular casing 7. The compressed air flow 8 generated by the compressor 4 feeds into the enclosure 5 via an annular diffuser 9 then an annular rectifier 10.

The combustion chamber 1 is delimited by coaxial inner and outer annular walls 11, 12 joined upstream by a substantially transverse bottom 13 of the chamber 1.

More specifically, according to the embodiment illustrated in the FIGURES, the chamber 1 is substantially radially centered in the enclosure 5 in such a way as to define, on the one hand, an inner annular air passage 14 radially delimited by the inner wall 11 and the inner casing 7, and on the other hand, an outer annular air passage 15 radially delimited by the outer wall 12 and the outer casing 6.

The chamber 1 is supplied with fuel via several fuel injection devices 16 which are angularly distributed around the axis C in a regular manner. More specifically, each injection device 16 is bent and comprises a head 17 which communicates with the chamber 1 via an adapter 18 attached to the bottom 13 in order to allow the fuel to be sprayed into the chamber 1.

The chamber 1 is supplied with compressed air in particular via supply ducts 19 formed in each of the adapters 18, also via so-called "primary" holes 20 (for example a circumferential row on the inner wall 11 and on the outer wall 12) and via "dilution" holes 21 (for example a circumferential row on the inner wall 11 and on the outer wall 12) located downstream of the primary holes 20. The primary holes and dilution holes 20, 21 are supplied with air via the inner and outer air passages 14, 15.

The combustion of the air/fuel mixture is initiated via one or more ignition devices 22 attached to the outer wall 12. In the example illustrated, the ignition devices 22 are located longitudinally at the level of the primary holes 20.

In order to cool the inner and outer walls 11, 12 of the combustion chamber 1, these comprise a plurality of cooling holes, generally inclined, distributed in the form of circumferential rows in such a way as to achieve cooling commonly known as "multi-perforation".

In order to protect the bottom 13 of the chamber 1 from the thermal radiation generated by combustion, the chamber 1 further comprises at least one annular deflector 23 placed in the chamber 1, substantially parallel to the bottom 13, and facing cooling orifices 24 formed in the bottom 13 of the chamber 1, the orifices 24 being passed through by the impact cooling air 25 of the deflector 23 coming from the compressor 4. The deflector 23 is furthermore attached to the inner and outer walls 11, 12 in a sealed manner, and the cooling air of the deflector 23 is discharged from the chamber 1 through exhaust holes 26 formed in the inner and outer walls 11, 12.

According to the embodiment illustrated in the FIGURES, the deflector is divided into sectors and comprises a plurality of sectors 23a of the deflector 23 angularly distributed around the axis C, the sectors 23a of the deflector 23 being joined in a sealed manner with respect to one another. The number of sectors 23a of the deflector 23 is equal to the number of fuel injection devices 16. Each sector 23a of the deflector 23 comprises a circular central opening 27 which is delimited by a projecting peripheral shoulder 28 inserted into a supported circular bore 29 of the adapter 18, each sector 23a of the deflector 23 facing cooling orifices 24 formed in the bottom 13. The space between the bottom 13 of the chamber 1 and the deflector 23 forms an annular cavity 30 (axis C of revolution) in which the cooling air 25 of the deflector 23 circulates before being discharged from the combustion chamber 1 via the exhaust holes 26.

The bottom 13 of the chamber 1 is covered upstream by an annular shroud 31 (axis C of revolution) reported to generally have, in a longitudinal half-section, a C shape with its concavity facing downstream. The shroud 31 thus forms an annular compartment 32 with the bottom 13 of the chamber 1. At the level of each injection device 16, the shroud 31 comprises a port 33 designed in particular for the passage of the injection device 16.

As illustrated in FIG. 1, in a longitudinal half-section, at the level of each injection device 16, the compressed air flow 8 generated by the compressor 4 is thus separated at the output of the rectifier 10 into three flows, namely a central air flow 34 entering the compartment 32 via the port 33, an inner bypass air flow 35 using the inner passage 14 and an outer bypass air flow 36 using the outer passage 15. The central air flow 34 is divided within the compartment 32 into an air flow 37 for supplying the combustion chamber 1 through the ducts 19 and an air flow 25 for cooling the sectors 23a of the deflector 23 through the orifices 24.

The sectors 23a of the deflector 23 are cooled by the impact of air jets created by the passage of the cooling air flow 25 of the sectors 23a of the deflector 23 through the cooling orifices 24 formed in the bottom 13 of the chamber 1. The cooling air 25 is then discharged from the combustion chamber 1 (and more specifically from the cavity 30) via the exhaust holes 26 to reach the inner and outer air passages 14, 15 passed through by the inner and outer bypass air flows 35, 36 respectively.

Figure 2:
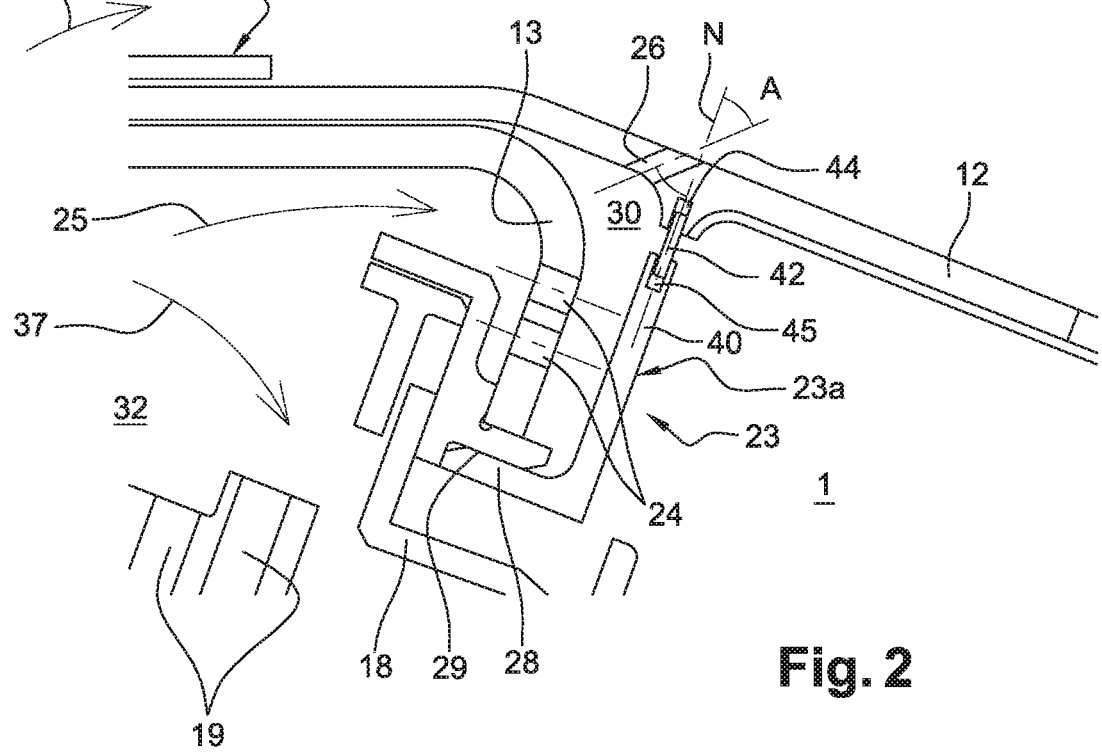
FIG. 2 is a detailed view of FIG. 1 illustrating in particular the attachment of a deflector sector of the combustion chamber.

According to the embodiment illustrated in the FIGURES and in particular FIGS. 1 and 2, the exhaust holes 26 are cylindrical and are each inclined at an angle A with respect to a normal N to the wall 11, 12 concerned passing through the hole 26. The angle A is between 30° and 70°, and is preferably 45°. The inclination of the exhaust holes 26 in the downstream direction facilitates the expulsion of the cooling air 25 of the sectors 23*a* of the deflector 23 from the combustion chamber 1 and more specifically from the cavity 30.

The pressure of the air in the inner passage 14 and in the outer passage 15 is lower than the pressure in the cavity 30 which allows the expulsion of the cooling air 25 of the sectors 23*a* of the deflector 23 from the combustion chamber 1 and more specifically from the cavity 30.

Figure 3:
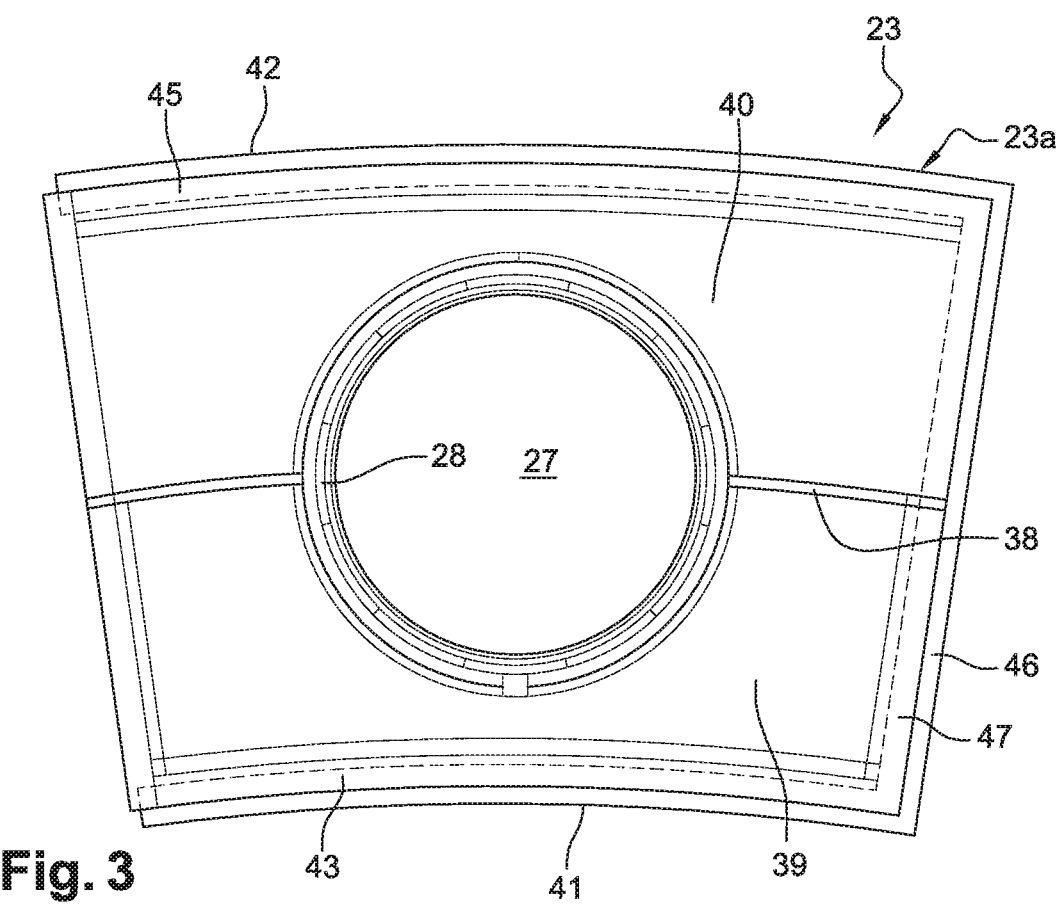
FIG. 3 is a front view of a deflector sector suitable for attachment in the combustion chamber.
Figure 4:
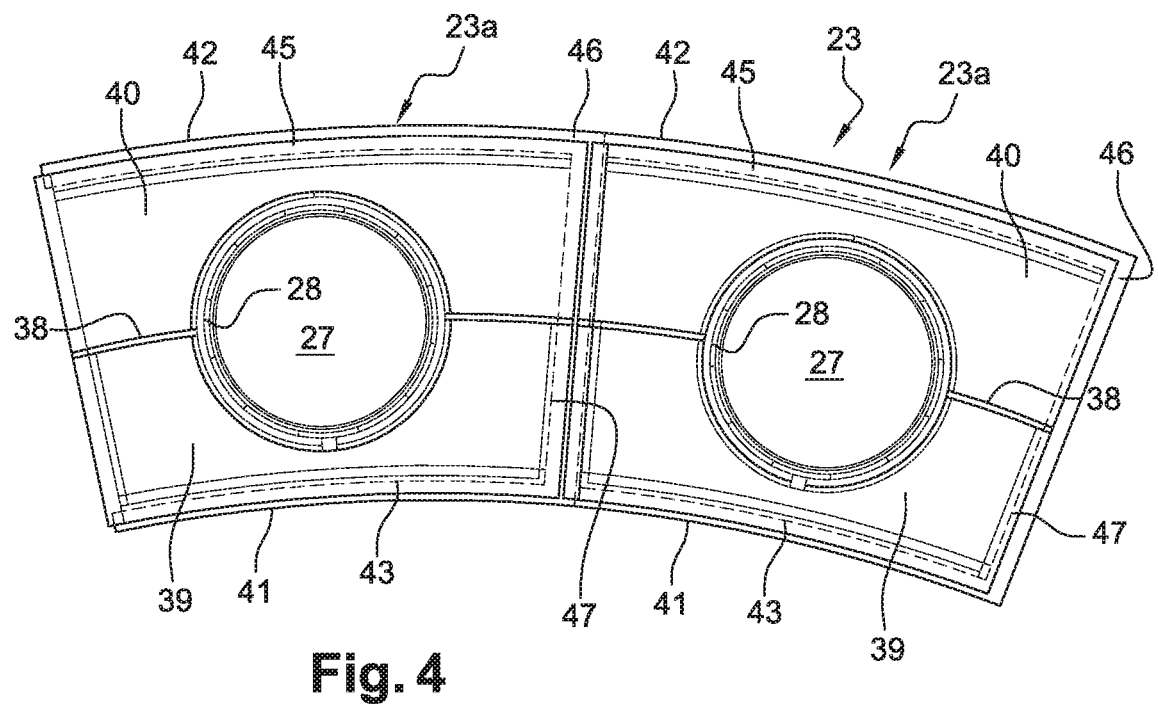
FIG. 4 is a front view of an assembly of two deflector sectors shown in FIG. 3.

According to the embodiment illustrated in the FIGURES and in particular FIGS. 3 and 4, in order to homogeneously distribute the cooling air 25 available, the deflector 23 comprises an annular partition 38 for separating the cooling air 25. The portion of the partition 38 of each sector 23*a* of the deflector 23 is in the form of a circular arc projecting towards the bottom 13 of the chamber 1. The partition 38 thus divides the deflector 23 in two, namely an inner annular portion 39 and an outer annular portion 40. According to the example shown, the partition 38 is centred radially on the deflector 23.

The radial positioning of the partition 38 makes it possible to adjust the quantity of cooling air 25 of the sectors 23*a* of the deflector 23 discharged into the inner and outer passages 14, 15 through the exhaust holes 26.

The cooling air 25 of the inner portion 39 of the deflector 23 experiences a pressure drop, between the pressure of the compartment 32 and the pressure of the inner passage 14, which is greater than the pressure drop of the cooling air 25 of the outer portion 40 of the deflector 23, between the pressure of the compartment 32 and the pressure of the outer passage 15.

According to the embodiment illustrated in the FIGURES, in order to homogenize the cooling of the sectors 23*a* of the deflector 23 while taking into account the difference in pressure drops, with an equal diameter, the number of cooling orifices 24 facing the outer portion 40 is greater than the number of cooling orifices 24 facing the inner portion 39, especially since the cross-section of the outer portion 40 is greater than the cross-section of the inner portion 39.

More specifically, according to the particular embodiment illustrated in the FIGURES, by way of example, on the one hand, two thousand five hundred and forty (2540) orifices 24 with a diameter of 0.95 mm are formed in the bottom 13 of the chamber 1 facing the outer portion 40, angularly distributed around the axis C in a regular manner, with a pressure drop of 0.6% calculated from the quotient of the air pressure difference in the compartment 32 and the outer passage 15, and the air pressure in the outer passage 15.

On the other hand, one thousand six hundred and eighty (1680) orifices 24 with a diameter of 0.95 mm are formed in the bottom 13 of the chamber 1 facing the inner portion 39, angularly distributed around the axis C in a regular manner, with a pressure drop of 0.9% calculated from the quotient between the air pressure difference in the compartment 32 and the inner passage 14, and the air pressure in the inner passage 14.

In order to homogenize the cooling of the different portions of the deflector 23 (namely the inner portion 39 and the outer portion 40), it is for example possible to lower the partition 38 radially in such a way as to have more cooling air 25 discharged into the outer passage 15.

The exhaust holes 26 are sized in such a way as to generate a minimum pressure drop, the exhaust holes 26 having, as the overall cross-section, a cross-section greater than three times the overall cross-section of the orifices 24.

More specifically, according to the embodiment illustrated in the FIGURES, by way of example, on the one hand, seven hundred and sixty (760) exhaust holes 26 with a diameter 3 mm are formed in the outer wall 12, angularly distributed around the axis C in a regular manner, for example in a circumferential row. On the other hand, in the same way, five hundred and six (506) exhaust holes 26 with a diameter of 3 mm are formed in the inner wall 11, angularly distributed around the axis C in a regular manner, for example in a circumferential row.

According to the embodiment illustrated in the FIGURES, the exhaust holes 26 are positioned axially (or longitudinally) between the bottom 13 of the chamber 1 and the deflector 23.

The sectors 23*a* of the deflector 23 are attached to the inner and outer walls 11 and 12 in a sealed manner.

According to the embodiment illustrated in the FIGURES, each sector 23*a* of the deflector 23 is attached to the inner and outer walls 11 and 12 in a sealed manner via circular inner and outer blades 41, 42 respectively, the inner blade 41 being engaged in an inner groove of the inner wall 11 and an inner circumferential housing 43 of the sector 23*a* of the deflector 23, and the outer blade 42 being engaged in an outer groove 44 of the outer wall 12 and an outer circumferential housing 45 of the sector 23*a* of the deflector 23.

The blades 41, 42 are mounted with axial and/or radial clearance in the grooves 44 and the housings 43, 45 in such a way as to allow the expansion of the combustion chamber 1 while at the same time ensuring the seal between the walls 11, 12 and the sectors 23*a* of the deflector 23 at different operating modes of the gas generator 2. For the same reasons, the deflector 23 is radially spaced apart from the outer wall 12 (with respect to the inner wall 11).

The sectors 23*a* of the deflector 23 are joined in a sealed manner with respect to one another.

According to the embodiment illustrated in the FIGURES, a first sector 23*a* of the deflector 23 is joined to a second adjacent sector 23*a* of the deflector 23 in a sealed manner via a radial straight tongue 46, the tongue 46 being engaged in radial recesses 47 of the first and second sectors 23*a* of the deflector 23. This method of attachment and different variants are presented in the application EP-A1-2012061 on behalf of the applicant. The first and second sectors 23*a* of the deflector 23 are spaced apart in such a way as to allow the expansion of the combustion chamber 1 while at the same time ensuring the seal between the two adjacent sectors 23*a* at different operating speeds of the gas generator 2.

According to the embodiment illustrated in the FIGURES, the inner and outer blades 41, 42 are formed integrally with the tongue 46 in such a way as to form a one-piece assembly, the assembly being, for example, made from a metallic material which is resistant to high temperatures (for example nickel-based and cobalt-based).

According to an embodiment which is not shown, the inner and outer blades 41, 42 and the tongue 46 are made independently of one another.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An annular combustion chamber for a turbine engine, the annular combustion chamber having an axis of revolution, the annular combustion chamber being delimited by an inner annular wall and an outer annular wall, the inner annular wall and the outer annular wall being coaxial and joined upstream by a substantially transverse bottom of the annular combustion chamber, the annular combustion chamber further comprising at least one annular deflector placed in the annular combustion chamber and substantially parallel to the substantially transverse bottom of the annular combustion chamber, the substantially transverse bottom of the annular combustion chamber comprising orifices configured to pass an impact cooling air therethrough from upstream towards the at least one annular deflector;

wherein the at least one annular deflector is attached to the inner annular wall and the outer annular wall by respective first sealed connections, and further wherein the inner annular wall and the outer annular wall further comprise exhaust holes that are configured to discharge the impact cooling air from the annular combustion chamber.

2. The annular combustion chamber of claim 1, wherein the at least one annular deflector comprises an annular partition for separating the impact cooling air, said annular partition projecting towards the substantially transverse bottom of the annular combustion chamber.

3. The annular combustion chamber of claim 1, wherein the at least one annular deflector comprises a plurality of deflector sectors that are angularly distributed around the axis of revolution, the plurality of deflector sectors being joined by second sealed connections.

4. The annular combustion chamber of claim 3, wherein each deflector sector of the plurality of deflector sectors is attached to the inner annular wall and the outer annular wall by the respective first sealed connections via an inner blade and an outer blade respectively, the inner blade being engaged in a groove made in an outer surface of the inner annular wall and an inner housing of the deflector sector, and the outer blade being engaged in a groove made in an inner surface of the outer annular wall and an outer housing of the deflector sector.

5. The annular combustion chamber of claim 4, wherein a first deflector sector of the plurality of deflector sectors is joined to an adjacent second deflector sector of the plurality of deflector sectors by a corresponding one of the second sealed connections via a radial tongue, the radial tongue being engaged in respective radial recesses of the first deflector sector and the adjacent second deflector sector.

6. The annular combustion chamber of claim 5, wherein the radial tongue is integrally formed with a corresponding inner blade and a corresponding outer blade to form a one-piece assembly.

7. The annular combustion chamber of claim 1, wherein each of the exhaust holes is inclined at an angle with respect to a normal to a corresponding one of the inner annular wall and the outer annular wall.

8. A turbine engine comprising the annular combustion chamber according to claim 1.

* * * * *